(12) United States Patent
Tomono et al.

(10) Patent No.: US 9,262,648 B2
(45) Date of Patent: Feb. 16, 2016

(54) DISPLAY DEVICE WITH AUTOMATIC VIEWING ANGLE CONTROL

(71) Applicant: FUJITSU LIMITED, Kawasaki-shi, Kanagawa (JP)

(72) Inventors: Mitsuru Tomono, San Jose, CA (US); Naomi Hadatsuki, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 279 days.

(21) Appl. No.: 13/773,972

(22) Filed: Feb. 22, 2013

(65) Prior Publication Data

US 2014/0240344 A1  Aug. 28, 2014

(51) Int. Cl.
*G06F 21/84* (2013.01)
*G09G 5/00* (2006.01)
*G06F 3/14* (2006.01)

(52) U.S. Cl.
CPC .................. *G06F 21/84* (2013.01); *G09G 5/00* (2013.01); *G06F 3/14* (2013.01); *G09G 2320/068* (2013.01); *G09G 2320/0613* (2013.01); *G09G 2358/00* (2013.01)

(58) Field of Classification Search
CPC ............ G09G 5/003; G09G 2320/028; G09G 2320/068; H04N 1/4056; G02B 6/0011; G02F 1/1335; G06F 21/62; G06F 21/6245; G06F 21/6254
See application file for complete search history.

(56) References Cited

U.S. PATENT DOCUMENTS

| 2006/0200339 A1* | 9/2006 | Satake et al. ....................... 704/4 |
| 2008/0316198 A1* | 12/2008 | Fukushima et al. .......... 345/214 |
| 2009/0055924 A1* | 2/2009 | Trotter ............................ 726/20 |
| 2009/0102770 A1* | 4/2009 | Iwata ....................... G09G 3/32 345/89 |
| 2009/0102990 A1* | 4/2009 | Walton et al. .................... 349/15 |
| 2009/0243971 A1* | 10/2009 | Uehara ........................... 345/32 |
| 2009/0304228 A1* | 12/2009 | Ishikawa et al. .............. 382/100 |
| 2014/0176562 A1* | 6/2014 | Somerfield ................... 345/443 |

FOREIGN PATENT DOCUMENTS

| EP | 2 235 713 A1 | 10/2010 |
| WO | 2009/073584 A1 | 6/2009 |

OTHER PUBLICATIONS

Elecom Co. Ltd. , Retrieved Feb. 21, 2013. <http://www2.elecom.co.jp/multimedia/monitor/lcm-tf1701ads/>.
"Privacy and Screen Protectors." 3M, Retrieved Feb. 21, 2013, <http://solutions.3m.com/wps/portal/3M/en_US/3MScreens_NA/Protectors/Shop_Products/Product_Catalog/~/Privacy-and-Screen-Protectors/Privacy-Filters?N=5019651&rt=c3>, NPL submitted herewith.

* cited by examiner

*Primary Examiner* — Ming Hon
*Assistant Examiner* — Phuc Doan
(74) *Attorney, Agent, or Firm* — Maschoff Brennan (57) ABSTRACT

A system of automatically changing a viewing angle of a display device based on a determination of content confidentiality includes a display device, an auditing application, and a privacy filter control. The auditing application is configured to analyze content to be displayed on the display device for confidentiality indicators. The privacy filter control is configured to automatically change a current viewing angle of the display device from a first viewing angle to a second viewing angle that is less than the first viewing angle when the content includes at least one confidentiality indicator and the current viewing angle of the display device is the first viewing angle.

20 Claims, 4 Drawing Sheets

DISPLAY DEVICE WITH AUTOMATIC VIEWING ANGLE CONTROL

FIELD

The embodiments discussed herein are related to a display device with automatic viewing angle control.

BACKGROUND

Mobile computing devices such as smartphones, tablet computers, and laptop computers are ubiquitous. The mobility of such devices allows users to access content for work or pleasure at virtually any time or location. Many businesses provide employees with mobile computing devices for work and/or allow employees to use personal mobile computing devices for work, e.g., in bring your own device (BYOD) environments.

Many businesses also have sensitive or confidential information. Such information may include records that are protected by government regulation (e.g., medical or financial records), proprietary corporate information, classified government information, or personal information. When employee access to such information is limited to nonmobile computing devices, such as desktop computers at a place of business, it is relatively easier to ensure that the information will not be inadvertently or surreptitiously viewed by third parties. When access to such information is available using a mobile computing device, however, employees may access the information in public locations where third parties may inadvertently or surreptitiously view the information on the mobile computing device.

Accordingly, various devices exist for protecting information displayed on the displays of mobile and/or desktop computing systems. For example, the 3M Company of the United States offers a wide array of privacy filters that may be attached to a display. When the privacy filter is attached to the display, the viewing angle of the display becomes smaller, thereby reducing the locations from which information on the display may be viewed and the likelihood that the information will be inadvertently or surreptitiously viewed by a third party. Such privacy filters typically have to be removed to change the viewing angle back to the relatively larger viewing angle of the display.

As another example, Elecom of Japan offers a display with a built-in privacy filter. The display has two viewing angles, including a relatively larger viewing angle and a relatively smaller viewing angle. To change viewing angles, a user has to manually press a button provided on the display. Unfortunately, users may forget to change to the relatively smaller viewing angle when confidential information is displayed.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system of automatically changing a viewing angle of a display device based on a determination of content confidentiality includes a display device, an auditing application, and a privacy filter control. The auditing application is configured to analyze content to be displayed on the display device for confidentiality indicators. The privacy filter control is configured to automatically change a current viewing angle of the display device from a first viewing angle to a second viewing angle that is less than the first viewing angle when the content includes at least one confidentiality indicator and the current viewing angle of the display device is the first viewing angle.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The embodiments discussed herein are related to a display device with automatic viewing angle control. In some embodiments, a display device includes an electronically-controlled privacy filter. Content to be displayed on the display device may be analyzed for any confidentiality indicators. Some non-limiting examples of confidentiality indicators include attributes, codes, keywords, or phrases associated with or included in the content. As more particular examples, a file attribute identifying a file as confidential, a code included in the hypertext markup language (HTML) of a web page identifying the web page as confidential, and/or keywords or phrases such as "confidential," "internal use only," and/or "attorney-client privilege" included in content may all indicate that the corresponding content is confidential and may thus serve as confidentiality indicators.

When the content includes at least one confidentiality indicator, a current viewing angle of the display device may be automatically changed from a relatively larger viewing angle to a relatively smaller viewing angle, or may be maintained at the relatively smaller viewing angle, as the case may be. The current viewing angle may be changed by an electronically-controlled privacy filter attached to or integrated with the display device. Accordingly, some embodiments described herein control the viewing angle of the display device so that confidential content is protected from observers outside of the relatively smaller viewing angle.

Embodiments of the present invention will be explained with reference to the accompanying drawings.

Figure 1:
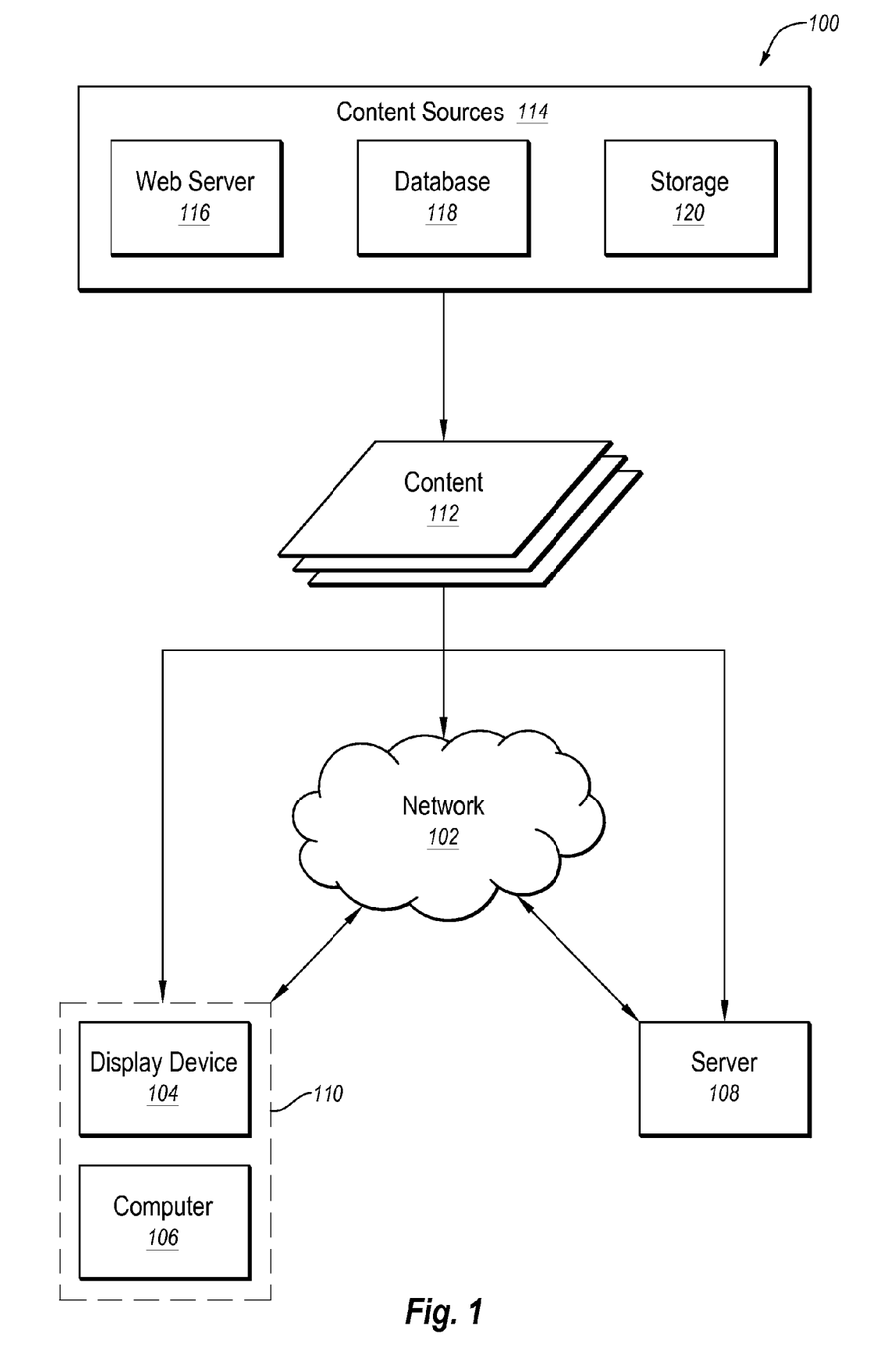
FIG. 1 is a block diagram of an example operating environment in which viewing angle control may be implemented.

FIG. 1 is a block diagram of an example operating environment 100 in which viewing angle control may be implemented, arranged in accordance with at least one embodiment described herein. The operating environment 100 may include a network 102, a display device 104, a computer 106, and a server 108. The display device 104 and the computer 106 may collectively form a computer system 110. The operating environment 100 may additionally include content 112 and content sources 114.

In general, the network 102 may include one or more wide area networks (WANs) and/or local area networks (LANs) that enable the computer system 110, the server 108, and/or the content sources 114 to communicate with each other. In some embodiments, the network 102 includes the Internet, including a global internetwork formed by logical and physical connections between multiple WANs and/or LANs. Alternately or additionally, the network 102 may include an intranet including a local or restricted private communication network. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

In general, the display device 104 is configured to display content 112 thereon. The content 112 may generally include electronic files, documents, and/or other content, and more particularly may include, but is not limited to, Microsoft Office® documents (such as documents ending with a .doc, .docx, .ppt, .pptx, .xls, or .xlsx file extension) and documents created by analogous software, e-mails, web pages, images, audio files, video files, and/or .pdf files, to name a few. Some of the content 112 may include confidential content, while other content 112 may include nonconfidential content. According to some embodiments, "confidential content" generally refers to content that is intended to be kept secret.

Accordingly, the content 112 may be analyzed for confidentiality indicators, which may include virtually any indicators that indicate the content 112 is confidential content. The analysis of the content 112 for confidentiality indicators may be performed by the computer 106 and/or by the server 108. Examples of confidentiality indicators include, but are not limited to, an attribute included in or associated with the content 112 (e.g., in metadata of the content 112) and which indicates the content 112 is confidential, a code included in or associated with the content 112 and which indicates the content 112 is confidential, and/or a keyword or phrase included in the content 112 and which is in a predetermined group of keywords or phrases. The predetermined group of keywords or phrases may include keywords or phrases which indicate that content is confidential content, such as "confidential," "internal use only," "attorney-client privileged," "confidential communication," "top secret," "classified," or even project-specific keywords or phrases associated with particular confidential projects. When the content 112 to be displayed on the display device 104 includes confidentiality indicators, a viewing angle of the display device 104 may be changed to or maintained at a relatively smaller viewing angle than when the content 112 to be displayed lacks such confidentiality indicators.

The content 112 may be received from any of a variety of content sources 114. The content sources 114 may include, for instance, one or more web servers 116, databases 118, and/or storage 120. For example, content 112 such as web pages may be received from the web server 116. Content 112 such as documents may be received from the database 118 (e.g., a document database) and/or from storage 120 (e.g., local or remote storage). The foregoing examples are provided by way of illustration only and should not be construed to limit the invention. Moreover, as illustrated in FIG. 1, the content 112 may be communicated to the computer 106 and/or the server 108 for analysis indirectly through the network 102, or directly depending on the content source 114.

The computer system 110 including the display device 104 and the computer 106 may be embodied as, for example, a desktop computer or a mobile computing device. In some desktop computer configurations, the computer 106 and the display device 104 may be discrete devices. In some mobile computing device configurations, the computer 106 and the display device 104 may be integrally formed as a unit. Examples of mobile computing devices in which the computer system 110 may be embodied include, but are not limited to, mobile phones, smartphones, tablet computers, and laptop computers.

Figure 2:
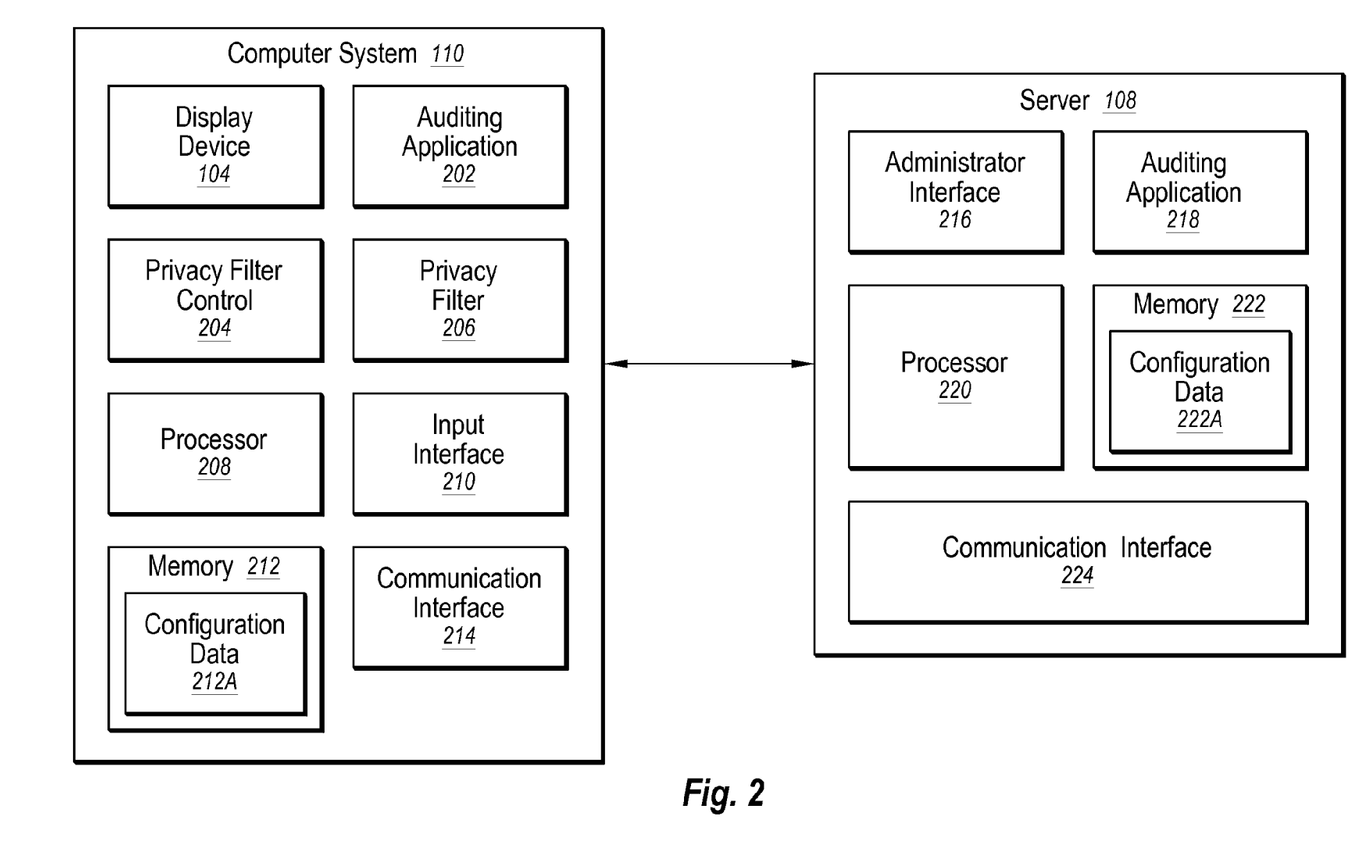
FIG. 2 illustrates a computer system and server that may be included in the operating environment of FIG. 1.

FIG. 2 illustrates the computer system 110 and the server 108 of FIG. 1 according to an example embodiment. In the illustrated embodiment, the computer system 110 includes the display device 104, an auditing application 202, and a privacy filter control 204. The computer system 110 may additionally include a privacy filter 206, a processor 208, an input interface 210, a memory 212, and a communication interface 214. The auditing application 202, the privacy filter control 204, the privacy filter 206, the processor 208, the input interface 210, the memory 212, and/or the communication interface 214 may be installed on or included in the computer 106 of FIG. 1. Although not shown, two or more of the components of the computer system 110 may be communicatively coupled via a communication bus including one or more of a memory bus, a storage interface bus, a bus/interface controller, an interface bus, or the like or any combination thereof.

The auditing application 202 is configured to analyze content to be displayed on the display device 104 for confidentiality indicators. The auditing application 202 may be further configured to receive an identification of the content prior to analyzing the content. For example, the content may include a file and the auditing application 202 may be configured to receive the identification of the content by receiving user input via the input interface 210, the user input being effective to select the file to be opened in a corresponding application. Thus, prior to the file being displayed, and/or as the corresponding application and/or the file is loading, the auditing application 202 may be configured to analyze the file. As another example, the content may include a web page and the auditing application 202 may be configured to receive the identification of the content by receiving user input via the input interface 210, the user input being effective to select the web page to be opened in a web browser. Thus, prior to the web page being displayed, and/or as the web browser and/or web page is loading, the auditing application 202 may be configured to analyze the web page.

The privacy filter control 204 may be configured to automatically change a current viewing angle of the display device 104 from a first viewing angle to a second viewing angle that is less than the first viewing angle when the content includes at least one confidentiality indicator and the current viewing angle of the display device 104 is the first viewing angle. More generally, the privacy filter control 204 may determine whether to change or maintain the current viewing angle depending on, e.g., whether content to be displayed includes one or more confidentiality indicators and/or the state of the current viewing angle.

The privacy filter 206 may include an electronically-controlled privacy filter configured to set the current viewing angle of the display device 104 responsive to signals received from the privacy filter control 204. In some embodiments, the privacy filter 206 may be built-in with the display device 104. Alternately or additionally, the privacy filter 206 may be a discrete device that may be attached to the display device 104. An example of a manually-controlled privacy filter built-in with a display device is marketed by Elecom of Japan as model number LCM-TF1701AD/S. See http://www2.elecom.co.jp/multimedia/monitor/lcm-tf1701ads/ (accessed on Jan. 31, 2013). One of skill in the art will appreciate, with the benefit of the present disclosure, that the design of such a display device with a built-in and manually-controlled privacy filter may be modified to make a display device with a built-in privacy filter that is electronically controlled so as to be responsive to signals received from, e.g., the privacy filter control 204 as described herein.

The processor 208 may be configured to execute computer instructions that cause the computer system 110 to perform the functions and operations described herein, such as analyzing content to be displayed on the display device for confidentiality indicators, automatically changing—or more generally, controlling—the current viewing angle of the display device depending on the presence of confidentiality indicators, and/or performing other functions described herein. The processor 208 may include, but is not limited to, a processor, a microprocessor (μP), a controller, a microcontroller (μC), a central processing unit (CPU), a digital signal processor (DSP), any combination thereof, or other suitable processor.

The input interface 210 may be configured to receive user input effective to identify content to be displayed on the display device 104 and/or effective to select content to be opened in a corresponding application, such as a web browser, a word processing application, a document viewer, or the like. Accordingly, the computer system 110 may further include an input device such as a keyboard, a mouse, a touch input device, or the like, that is configured to receive the user input. In some embodiments, the input interface 210 may include one or more peripheral interfaces, such as a serial interface controller and/or a parallel interface controller, which may be configured to communicate with external devices such as input devices (e.g., keyboard, mouse, touch input device, etc.) or other peripheral devices (e.g., printer, scanner, etc.).

Computer instructions may be loaded into the memory 212 for execution by the processor 208. For example, the computer instructions may be in the form of the auditing application 202 and/or the privacy filter control 204. Execution of the auditing application 202 and/or the privacy filter control 204 by the processor 208 may cause the computer system 110 to perform the functions and operations as described herein. In some embodiments, data generated, received, and/or operated on during performance of the functions and operations, such as the content, may be at least temporarily stored in the memory 212. The memory 212 may include volatile storage such as random access memory (RAM) or other suitable storage. The memory 212 is an example of a non-transitory computer-readable medium, aspects of which are described in more detail below.

Alternately or additionally, configuration data 212A may be stored, at least temporarily, in the memory 212. The configuration data 212A may include data that controls operation of the auditing application 202 and/or the privacy filter control 204. For example, the configuration data 212A may specify whether the auditing application 202 is active or inactive, one or more viewing angles for the display device 104, whether to analyze all content or only particular types of content for confidentiality indicators, and/or the particular types of content to analyze (or not to analyze) when less than all content is to be analyzed. Alternately or additionally, the configuration data 212A may specify one or more confidentiality indicators that indicate whether content should be considered confidential content. For example, the configuration data 212A may include a listing of one or more attributes, codes, keywords, and/or phrases that serve as confidentiality indicators. The configuration data 212A may include default settings, user-defined settings, and/or administrator-defined settings. User-defined settings may be generated in response to user input received via the input interface 210. Administrator-defined settings may be generated in response to administrator input as described in more detail below. Alternately or additionally, the administrator-defined settings included in the configuration data 212A may include permissions granted by an administrator to a user to override one or more settings of the auditing application 202, the privacy filter control 204, or the like or any combination thereof.

The communication interface 214 may be configured to facilitate communications over a network, such as the network 102 of FIG. 1, between the computer system 110 and other systems, users, and/or processes, such as the server 108 and/or the content sources 114 of FIG. 1. In these and other embodiments, the communication interface 214 may include, but is not limited to, a network interface card, a network adapter, a local area network (LAN) adapter, or other suitable communication interface.

The server 108 may include an administrator interface 216, an auditing application 218, a processor 220, a memory 222, and a communication interface 224. The administrator interface 216 may be configured to receive, from an administrator such as an IT administrator, administrator input effective to, among potentially other things, activate or deactivate the auditing application 202, generate administrator-defined settings included in the configuration data 212A, or the like or any combination thereof. The administrator input may be effective to configure operation of the auditing application 202 (or the auditing application 218) and/or the privacy filter control 204 independent of a user of the display device. Thus, the administrator interface 216, when combined with the auditing application 202 (or 218) and/or the privacy filter control 204 on user computer systems, may allow an IT administrator or other person of a business or other entity with confidential content to control privacy settings of user computer systems that have access to the confidential content. In particular, the administrator interface 216 may allow the IT administrator to configure the user computer systems to change (or maintain) the current viewing angle of corresponding display devices at a relatively smaller viewing angle when the entity's confidential content is displayed on the display devices. Alternately or additionally, the administrator input may be effective to grant permissions to the user of the computer system 110 to override one or more settings of the auditing application 202, the privacy filter control 204, or the like or any combination thereof.

The auditing application 218 generally performs the same functions as the auditing application 202 as already described, although the functions are performed by the server 108. For example, when the computer system 110 accesses content through the server 108, such as over a virtual private network (VPN) with the server 108, the auditing application 218 may analyze the content for confidentiality indicators and may communicate the results of the analysis to the privacy filter control 204 on the computer system 110, or to a privacy filter control (not shown) on the server 108. The privacy filter control 204 (or a privacy filter control at the server 108) may accordingly generate control signals to control the viewing angle of the display device 104.

The processor 220 may be configured to execute computer instructions that cause the server 108 to perform the functions and operations described herein, such as analyzing content to be displayed on the display device for confidentiality indicators, automatically changing—or more generally, controlling—the current viewing angle of the display device depending on the presence of confidentiality indicators, and/or performing other functions described herein. The processor 220 may include, but is not limited to, a processor, a μP, a controller, a μC, a CPU, a DSP, any combination thereof, or other suitable processor.

Computer instructions may be loaded into the memory 222 for execution by the processor 220. For example, the computer instructions may be in the form of the auditing application 218 and/or a privacy filter control at the server 108. Execution of the auditing application 218 and/or a privacy filter control by the processor 220 may cause the server 108 to perform the functions and operations as described herein. In some embodiments, data generated, received, and/or operated on during performance of the functions and operations, such as the content, may be at least temporarily stored in the memory 222. The memory 222 may include volatile storage such as RAM or other suitable storage. The memory 222 is an example of a non-transitory computer-readable medium, aspects of which are described in more detail below. Alternately or additionally, configuration data 222A may be stored, at least temporarily, in the memory 222. The configuration data 222A may generally include the same data, or the same kind of data, as the configuration data 212A already described above.

The communication interface 224 may be configured to facilitate communications over a network, such as the network 102 of FIG. 1, between the server 108 and other systems, users, and/or processes, such as the computer system 110 and/or the content sources 114 of FIG. 1. In these and other embodiments, the communication interface 224 may include, but is not limited to, a network interface card, a network adapter, a LAN adapter, or other suitable communication interface.

It will be appreciated, with the benefit of the present disclosure, that FIG. 2 illustrates at least two configurations for controlling the viewing angle of the display device 104 depending on content confidentiality. In one configuration, the auditing application 202 is installed and executes locally on the same computer system 110 as the display device 104. In another configuration, the auditing application 218 is provided on the server 108 remote from the computer system 110. Alternately or additionally, modules implementing some or all of the functionality of the auditing applications 202, 218 may be provided on each of the computer system 110 and the server 108 and may cooperate to control the viewing angle of the display device 110 based on content confidentiality.

Various components above, such as the auditing applications 202, 218 and the privacy filter control 204, have been described primarily as being implemented in software. In other embodiments, one or more of such components may be at least partially implemented in hardware.

In some embodiments, the auditing applications 202, 218, the privacy filter control 204, and/or other components described herein may run in the background of an operating system (not shown) of the corresponding computer system 110 and/or server 108. Alternately or additionally, such components may be activated or deactivated by an administrator and/or by a user of the computer system 110.

Some embodiments described herein may allow users to apply automatic privacy controls to improve privacy for confidential content displayed on the display device 104. Thus, the users may access confidential content and/or nonconfidential content with the assurance that the display device viewing angle will be automatically changed depending on the content and without having to manually change the viewing angle. Alternately or additionally, some embodiments may allow an IT administrator or more generally a business or other entity to enforce the application of automatic privacy controls when confidential content is displayed on display devices associated with authorized users. Such control may be useful in bring your own device (BYOD) work environments where users view content on personal devices. In some embodiments, for example, as a condition of being provided with access to confidential content, an auditing application 202, privacy filter control 204, and/or other components may have to be installed on the users' personal devices.

Figure 3A:
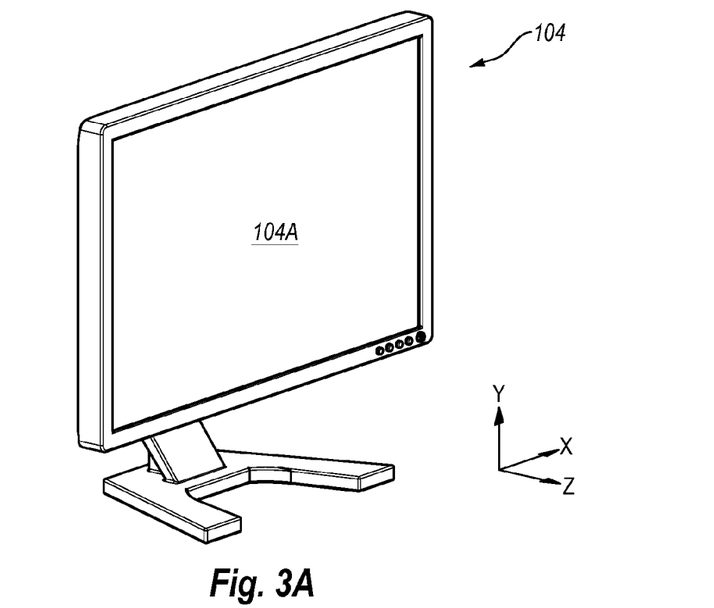
FIGS. 3A-3C include various views of an example embodiment of a display device of FIG. 1.
Figure 3B:
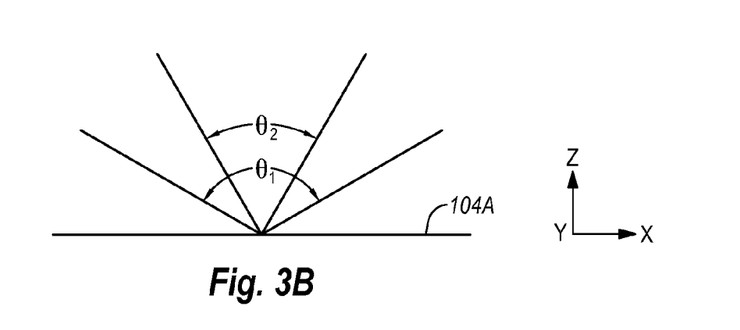
Figure 3C:
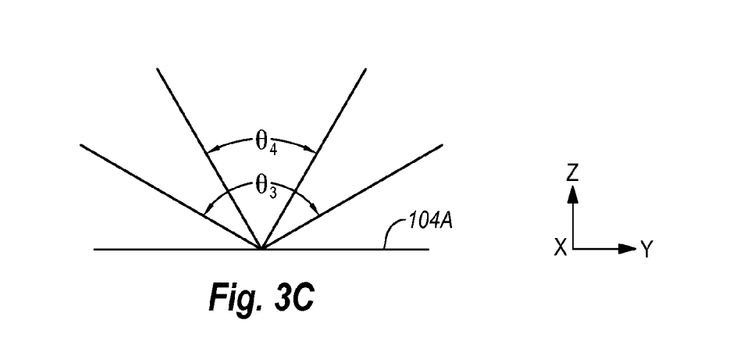

FIGS. 3A-3C include various views of an example embodiment of the display device 104 of FIG. 1, arranged in accordance with at least one embodiment described herein. In more detail, FIG. 3A is a perspective view, FIG. 3B is a simplified overhead view, and FIG. 3C is a simplified side view of an example embodiment of the display device 104 of FIG. 1. FIGS. 3A-3C additionally include arbitrarily defined X, Y, and Z coordinate axes for orientation. The display device 104 includes a display surface 104A that is parallel to the XY plane.

With combined reference to FIGS. 3A-3C, the term "viewing angle" will now be described. In general, "viewing angle" refers to a maximum angle at which a display device may be viewed with acceptable visual performance. The display device 104 includes both a horizontal viewing angle as illustrated in FIG. 3B, and a vertical viewing angle as illustrated in FIG. 3C. The horizontal and vertical viewing angles may be part of a viewing cone that defines all of the directions from which the display device 104 may be seen with acceptable visual performance. When the horizontal and vertical viewing angles are the same, the viewing cone may have circular cross sections in planes parallel to the XY plane. On the other hand, when the horizontal and vertical viewing angles are different, the viewing cone may have elliptical cross sections in planes parallel to the XY plane.

Referring to FIG. 3B, the horizontal viewing angle generally refers to the maximum angle, as projected into the XZ plane, at which the display device 104 may be viewed with acceptable visual performance. Analogously, and referring to FIG. 3C, the vertical viewing angle generally refers to the maximum angle, as projected into the YZ plane, at which the device 104 may be viewed with acceptable visual performance.

According to embodiments described herein, the current viewing angle of the display device 104 may be changed between at least two viewing angles. For instance, as illustrated in FIG. 3B, the display device 104 may be changed between a first horizontal viewing angle $\theta_1$ and a second horizontal viewing angle $\theta_2$ that is less than the first horizontal viewing angle $\theta_1$. Analogously, and as illustrated in FIG. 3C, the display device 104 may be changed between a first vertical viewing angle $\theta_3$ and a second vertical viewing angle $\theta_4$ that is less than the first vertical viewing angle $\theta_3$.

The first horizontal viewing angle $\theta_1$ and the first vertical viewing angle $\theta_3$ may be the same or different. Additionally, the second horizontal viewing angle $\theta_2$ and the second vertical viewing angle $\theta_4$ may be the same or different. Moreover, as used herein, changing the current viewing angle from one viewing angle to another may refer to changing the viewing angle in a single direction (e.g., only the horizontal viewing angle or only the vertical viewing angle), in multiple directions (e.g., both the horizontal and vertical viewing angles), or for the entire viewing cone of the display device 104, or the like or any combination thereof.

The values of the viewing angles $\theta_1$-$\theta_4$ may depend on the native capabilities of the display device 104 and/or the corresponding privacy filter 206, and/or may be set as default values or configured by a user or administrator in, e.g., the configuration data 212A or 222A of FIG. 2.

As may be appreciated from FIGS. 3B-3C, the relatively smaller viewing angles $\theta_2$ and $\theta_4$ provide greater privacy for content displayed on the display device 104 than the relatively larger viewing angles $\theta_1$ and $\theta_3$. In particular, when the current viewing angle(s) is(are) set at the second viewing angle(s) $\theta_2$ and/or $\theta_4$, it is more difficult to properly view the content, as compared to the current viewing angle(s) being set at the first viewing angle(s) $\theta_1$ and/or $\theta_3$, except from directly in front of the display device 104. Thus, it may be more difficult for third parties not positioned directly in front of the display device 104 to view the content.

Although only two viewing angles are illustrated in each of FIGS. 3B and 3C, more generally, the display device 104 may be configured with any number of viewing angles for one or more directions (e.g., horizontal, vertical). In these and other embodiments, a more granular approach may be taken for controlling the viewing angle of the display device 104. For instance, the first viewing angle(s) $\theta_1$ and/or $\theta_3$ may be used when nonconfidential content is displayed, the second viewing angle(s) $\theta_2$ and/or $\theta_4$ may be used when a first type or level of confidential content is displayed, a third viewing angle even smaller than the second viewing angle(s) $\theta_2$ and/or $\theta_4$ may be used for content that is even more confidential or sensitive than the first type or level of confidential content, and so on.

Figure 4:
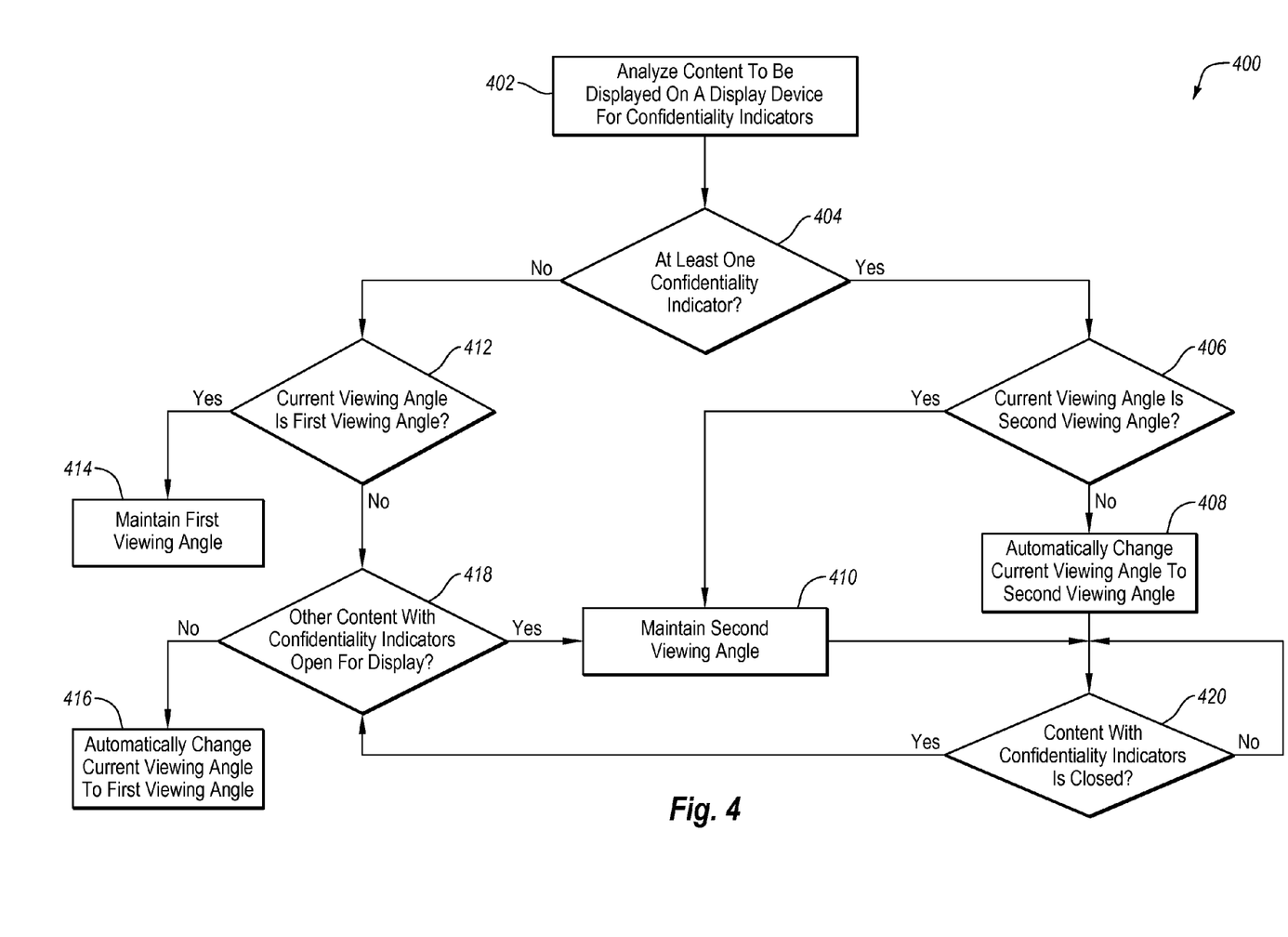
FIG. 4 shows an example flow diagram of a method of automatically changing a viewing angle of a display device based on a determination of content confidentiality.

FIG. 4 shows an example flow diagram of a method 400 of automatically changing a viewing angle of a display device based on a determination of content confidentiality, arranged in accordance with at least one embodiment described herein. The method 400 in some embodiments is performed by the computer system 110 and/or the server 108 of FIGS. 1-2, e.g., by execution of the auditing application 202, the privacy filter control 204, and/or the auditing application 218 of FIG. 2. As one example, the processor 208 of FIG. 2 may be configured to execute computer instructions such as the auditing application 202 and/or the privacy filter control 204 to perform functions and operations for changing a viewing angle of a display device, as represented by one or more of the blocks of the method 400 of FIG. 4. Although illustrated as discrete blocks, various blocks may be divided into additional blocks, combined into fewer blocks, or eliminated, depending on the desired implementation.

The method may begin at block 402 in which content to be displayed on a display device is analyzed for confidentiality indicators. The display device may be set at a current viewing angle selected from a group including at least a first viewing and a second viewing angle that is less than the first viewing angle. Analyzing the content may include scanning text included in or associated with the content for confidentiality indicators; scanning attributes or other metadata associated with the content for confidentiality indicators; scanning an image, audio file, or video file for confidentiality indicators, or the like or any combination thereof.

If there is at least one confidentiality indicator in the content ("Yes" at block 404) and the current viewing angle of the display device is not set at the second viewing angle ("No" at block 406), at block 408, the current viewing angle is automatically changed to the second viewing angle. Optionally, the current viewing angle may be automatically changed to the second viewing angle from the first viewing angle. The automatically changing may include automatically changing a horizontal viewing angle, a vertical viewing angle, or both.

If there is at least one confidentiality indicator in the content ("Yes" at block 404) and the current viewing angle of the display device is set at the second viewing angle ("Yes" at block 406), at block 410, the current viewing angle may be maintained at the second viewing angle.

On the other hand, if there are no confidentiality indicators in the content ("No" at block 404) and the current viewing angle of the display device is set at the first viewing angle ("Yes" at block 412), at block 414, the current viewing angle may be maintained at the first viewing angle.

If there are no confidentiality indicators in the content ("No" at block 404) and the current viewing angle of the display device is not set at the first viewing angle ("No" at block 412), at block 416, the current viewing angle may be automatically changed from the second viewing angle to the first viewing angle. The automatically changing may include automatically changing a horizontal viewing angle, a vertical viewing angle, or both.

Optionally, prior to block 416, it may be determined at block 418 whether there is other content with confidentiality indicators open for display on the display device. As used herein, "open for display" may indicate only that the content is opened in a currently-running application, whether or not the content is currently being displayed on the display device. For example, the content may be "open for display" when the content is open in a running application that is minimized and/or is behind a different application such that the content is not currently being displayed. The content may also be "open for display" when the content is in a running application and the content is currently being displayed.

If there is no other content with confidentiality indicators open for display ("No" at block 418), the method 400 may proceed to block 416 in which the current viewing angle may be automatically changed from the second viewing angle to the first viewing angle, as already described above.

If there is other content with confidentiality indicators open for display ("Yes" at block 418), the method 400 may proceed to block 410 in which the current viewing angle is maintained at the second viewing angle, as already described above.

The method 400 may proceed from both block 410 and block 408 to block 420 in which it is determined whether content with confidentiality indicators has been closed. If not ("No" at block 420), the determination at block 420 repeats. If content with confidentiality indicators has been closed ("Yes" at block 420), the method 400 proceeds to block 418 where it is determined whether other content with confidentiality indicators is still open for display, as already described above.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 400 has been described above as including a determination at block 418 of whether other content with confidentiality indicators is open for display. In other embodiments, the determination at block 418 may be replaced by a determination of whether content with confidentiality indicators is currently being displayed on the display device. Thus, if content with confidentiality indicators is open for display but is minimized, or is behind another application lacking confidentiality indicators, or is otherwise not currently being displayed, the current viewing angle may be maintained or changed to the first viewing angle. Alternately, if the content with confidentiality indicators is open for display and is currently being displayed, the current viewing angle may be maintained or changed to the second viewing angle. In these and other embodiments, the determination at block 420 may be replaced by a determination of whether content with confidentiality indicators is not currently being displayed.

As another example, the method 400 may further include receiving an identification of the content prior to analyzing the content. In some embodiments, the content may include a file and the receiving may include receiving user input effective to select the file to be opened in a corresponding application. Alternately or additionally, the content may include a web page and the receiving may include receiving user input effective to select the web page to be opened in a web browser.

Some embodiments described herein include an article of manufacture such as a non-transitory computer-readable medium having computer instructions stored thereon that are executable by a processing device to perform one or more of the operations included in the method 400 of FIG. 4 and/or variations thereof. The non-transitory computer-readable medium may include the memory 212, 222 of FIG. 2, for example. The processing device may include the processor 208, 220 of FIG. 2, for example.

Some embodiments described herein may alternately or additionally include a processor configured to execute computer instructions to cause a system to perform operations for automatically changing a viewing angle of a display device based on a determination of content confidentiality. The operations may include one or more of the operations included in the method 400 of FIG. 4 and/or variations thereof.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system of automatically changing a viewing angle of a display device based on a determination of content confidentiality types or levels, the system comprising:
   a display device;
   an auditing application configured to analyze content to be displayed on the display device for confidentiality indicators of at least three levels of confidentiality;
   a privacy filter control configured to automatically change a current viewing angle of the display device:
      from a first viewing angle associated with a first level of confidentiality to a second viewing angle that is less than the first viewing angle based on the content being at a second level of confidentiality more confidential than the first level of confidentiality; and
      from the first viewing angle to a third viewing angle that is less than the second viewing angle based on the content being at a third level of confidentiality more confidential than the second level of confidentiality; and
   an electronically-controlled privacy filter disposed in front of the display device and configured to set the current viewing angle of the display device responsive to signals received from the privacy filter control.

2. The system of claim 1, wherein the system is embodied as a mobile computing device including a mobile phone, a smartphone, a tablet computer, or a laptop computer.

3. The system of claim 1, further comprising an input interface, wherein the auditing application is further configured to receive an identification of the content prior to analyzing the content; and one of:
   the content comprises a file and the auditing application is configured to receive the identification of content by receiving user input via the input interface, the user input being effective to select the file to be opened in a corresponding application; or
   the content comprises a web page and the auditing application is configured to receive the identification of content by receiving user input via the input interface, the user input being effective to select the web page to be opened in a web browser.

4. The system of claim 1, further comprising an administrator interface configured to receive administrator input effective to configure operation of the auditing application and the privacy filter independent of a user of the display device.

5. The system of claim 1, wherein the at least one confidentiality indicator comprises an attribute associated with the content and which indicates the content is confidential, a code included in or associated with the content and which indicates the content is confidential, or a keyword or phrase included in the content and which is in a predetermined group of keywords or phrases.

6. The system of claim 1, wherein the auditing application is configured to analyze the content for confidentiality indicators indicative of a confidentiality level of the content by scanning text included in the content for confidentiality indicators; scanning attributes associated with the content for confidentiality indicators; and/or scanning an image, audio file, or video file for confidentiality indicators.

7. A method of automatically changing a viewing angle of a display device based on a determination of content confidentiality types or levels, the method comprising:
analyzing content to be displayed on a display device for confidentiality indicators of at least three confidentiality levels; and
automatically changing a current viewing angle of the display device from a first viewing angle to a second viewing angle instead of to a third viewing angle, the first viewing angle associated with a first level of confidentiality, the second viewing angle being less than the first viewing angle and associated with a second level of confidentiality more confidential than the first level of confidentiality, the third viewing angle being less than the second viewing angle and associated with a third level of confidentiality more confidential than the second level of confidentiality, the automatically changing based on the content being at the second level of confidentiality instead of the third level of confidentiality, and the automatically changing including sending signals to an electronically-controlled privacy filter disposed in front of the display device to set the current viewing angle of the display device.

8. The method of claim 7, further comprising receiving an identification of the content prior to analyzing the content, wherein:
the content comprises a file and the receiving comprises receiving user input effective to select the file to be opened in a corresponding application; or
the content comprises a web page and the receiving comprises receiving user input effective to select the web page to be opened in a web browser.

9. The method of claim 7, wherein the analyzing comprises scanning text included in the content for confidentiality indicators; scanning attributes associated with the content for confidentiality indicators; and/or scanning an image, audio file, or video file for confidentiality indicators.

10. The method of claim 7, wherein the confidentiality indicators each comprise an attribute associated with the content and which indicates the content is confidential, a code included in or associated with the content and which indicates the content is confidential, or a keyword or phrase included in the content and which is in a predetermined group of keywords or phrases.

11. The method of claim 7, wherein the automatically changing comprises automatically changing a horizontal viewing angle of the display device, a vertical viewing angle of the display device, or both the horizontal viewing angle and the vertical viewing angle.

12. The method of claim 7, further comprising:
maintaining the current viewing angle at the second viewing angle when the content is at the second level of confidentiality and the current viewing angle is at the second viewing angle;
automatically changing the current viewing angle to the third viewing angle when the content is at the third level of confidentiality; or
automatically changing the current viewing angle from the second viewing angle to the first viewing angle when the content lacks any confidentiality indicators and the current viewing angle is at the second viewing angle.

13. The method of claim 7, further comprising, after the content is closed:
automatically changing the current viewing angle from the second viewing angle to the first viewing angle when no other content with at least one confidentiality indicator is open for display on the display device; or
maintaining the current viewing angle at the second viewing angle when other content with at least one confidentiality indicator at the second level of confidentiality and no content at the third level of confidentiality is open for display on the display device.

14. A non-transitory computer-readable medium having computer instructions stored thereon that are executable by a processing device to perform the method of claim 7.

15. A processor configured to execute computer instructions to cause a system to perform operations for automatically changing a viewing angle of a display device based on a determination of content confidentiality types or levels, the operations comprising:
analyzing content to be displayed on a display device for confidentiality indicators of at least three confidentiality levels; and
automatically changing a current viewing angle of the display device from a first viewing angle to a second viewing angle instead of to a third viewing angle, the first viewing angle associated with a first level of confidentiality, the second viewing angle being less than the first viewing angle and associated with a second level of confidentiality more confidential than the first level of confidentiality, the third viewing angle being less than the second viewing angle and associated with a third level of confidentiality more confidential than the second level of confidentiality, the automatically changing based on the content being at the second level of confidentiality instead of the third level of confidentiality, and the automatically changing including sending signals to an electronically-controlled privacy filter disposed in front of the display device to set the current viewing angle of the display device.

16. The processor of claim 15, wherein the analyzing comprises scanning text included in the content for confidentiality indicators; scanning attributes associated with the content for confidentiality indicators; and/or scanning an image, audio file, or video file for confidentiality indicators.

17. The processor of claim 15, wherein the automatically changing comprises automatically changing a horizontal viewing angle of the display device, a vertical viewing angle of the display device, or both the horizontal viewing angle and the vertical viewing angle.

18. The processor of claim 15, wherein the operations further comprise:
maintaining the current viewing angle at the second viewing angle when the content is at the second level of confidentiality and the current viewing angle is at the second viewing angle;
automatically changing the current viewing angle to the third viewing angle when the content is at the third level of confidentiality; or
automatically changing the current viewing angle from the second viewing angle to the first viewing angle when the content lacks any confidentiality indicators and the current viewing angle is at the second viewing angle.

19. The processor of claim 15, wherein the operations further comprise, after the content is closed:
automatically changing the current viewing angle from the second viewing angle to the first viewing angle when no other content with at least one confidentiality indicator is open for display on the display device; or
maintaining the current viewing angle at the second viewing angle when other content at the second level of confidentiality and no content at the third level of confidentiality is open for display on the display device.

20. The system of claim 1, wherein the privacy filter is further configured to set the current viewing angle of the display device to the first viewing angle when the content is at the first level of confidentiality and no other content at the second or the third confidentiality levels is open for display on the display device.

* * * * *